United States Patent [19]

Meyer

[11] 4,318,762
[45] Mar. 9, 1982

[54] METHOD AND APPARATUS FOR SEQUENTIALLY FORMING A MOLDED PRODUCT

[75] Inventor: Leonard S. Meyer, Columbia, S.C.

[73] Assignee: Victor United, Inc., Chicago, Ill.

[21] Appl. No.: 141,883

[22] Filed: Apr. 21, 1980

[51] Int. Cl.³ .......................... B29C 3/04; B29D 3/02
[52] U.S. Cl. ..................................... 156/180; 83/277;
100/215; 156/273; 156/379.6; 156/441;
226/162; 264/26; 264/137; 264/145; 264/165;
264/250; 425/93; 425/116; 425/122; 425/174.8
E; 425/236; 425/289
[58] Field of Search ................ 226/128, 149, 150, 158,
226/162, 167; 83/277; 156/166, 180, 199, 242,
245, 273, 380, 428, 433, 543, 576, 441; 425/115,
116, 122, 174.4, 174.8 E, 174.8 R, 236, DIG. 13,
502, 505, 508, 511, 519; 100/215, 216, 218;
264/137, 334, 25, 26, 138, 145, 165, 166, 174,
250

[56] References Cited

U.S. PATENT DOCUMENTS

| | | | |
|---|---|---|---|
| 3,123,270 | 3/1964 | Olson | 226/162 |
| 3,329,327 | 7/1967 | Scribner | 226/162 |
| 3,530,212 | 9/1970 | Kienle et al. | 156/180 |
| 3,556,888 | 1/1971 | Goldsworthy | 156/180 |
| 3,583,268 | 6/1971 | Scribner | 226/162 |
| 3,709,419 | 1/1973 | Varga | 226/162 |
| 3,741,458 | 6/1973 | Aylesworth | 226/162 |
| 4,051,987 | 10/1977 | Scribner | 226/162 |

*Primary Examiner*—Willard E. Hoag
*Attorney, Agent, or Firm*—Emory L. Groff, Jr.

[57] ABSTRACT

A reinforced plastic product is molded from a bundle of resin impregnated strands with the bundle being sequentially advanced from a supply station to a molding station by two pairs of clamping assemblies simultaneously reciprocating in opposite directions with the forward moving pair gripping the bundle and pulling it to the molding station as the rearward moving pair is shuttled back past the forward moving pair toward the supply station to grip the bundle prior to molding of the forward gripped bundle.

20 Claims, 5 Drawing Figures

FIG. 4.
FIG. 3.
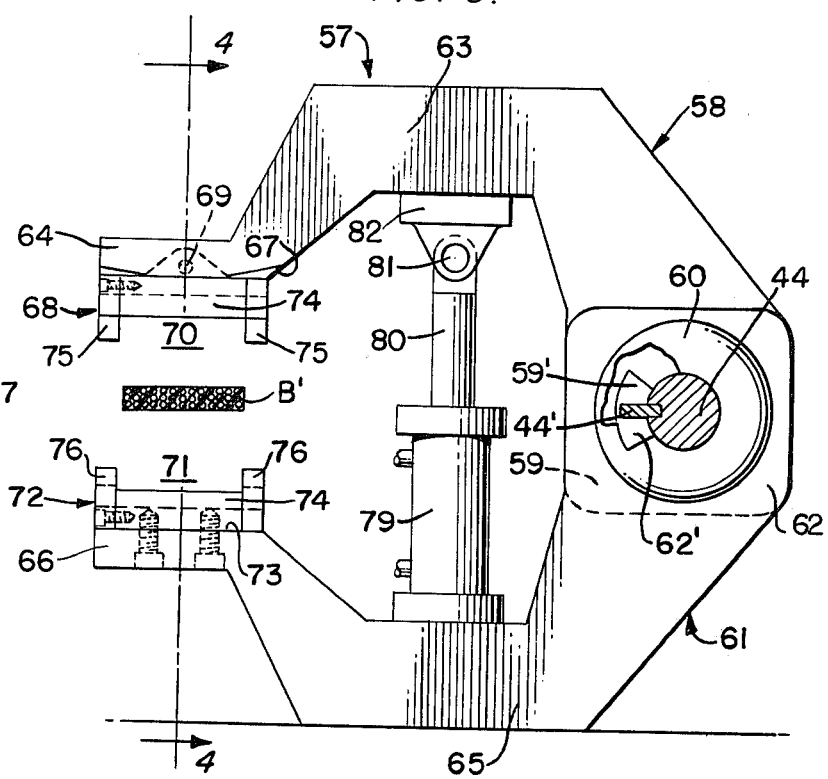
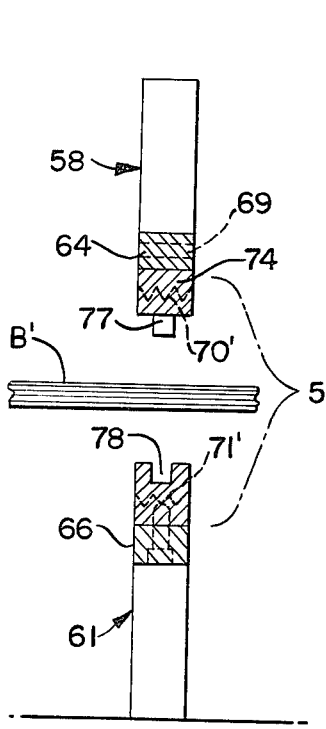
FIG. 5.
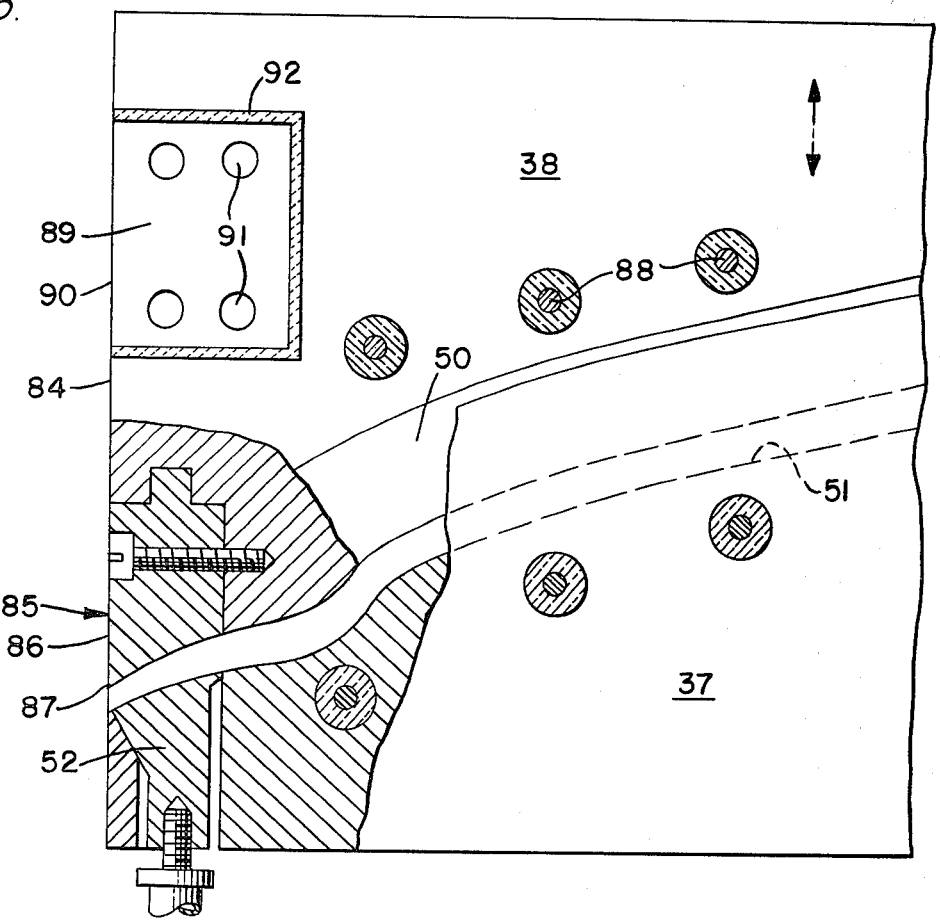

METHOD AND APPARATUS FOR SEQUENTIALLY FORMING A MOLDED PRODUCT

This invention relates generally to formation of molded products and more particularly to an improved method and apparatus for continuously sequentially advancing an indefinite length of resin impregnated fibers to a reciprocating molding and curing station.

Improvements are constantly being sought to enhance the efficiency of the manufacture of molded products produced from reinforced plastic compositions. The molding of parts by utilizing resin impregnated strands of a reinforcing material such as glass fibers has long been recognized as a feasible procedure for producing elongated products. U.S. Pat. No. 2,980,158 issued on Apr. 18, 1961 to the inventor of the present invention will serve as an example of a method and apparatus wherein strands comprising resin impregnated glass fibers are wound upon a rack or frame and subsequently subjected to heat and pressure between reciprocating mold sections to produce an end product comprising an elongated member of irregular longitudinal configuration.

The instant invention serves as a significant improvement over methods and apparatus heretofore known and is especially adapted to the manufacture of elongated parts which in cross section may comprise either circular, oval, rectangular or flat configurations having a longitudinal extent substantially greater than the transverse dimensions. When viewed in top horizontal plan the product preferably exhibits a straight axis but may include, when viewed in a side vertical elevation, a configuration defining a simple, curve, compound curve or irregular curve. Well known products which find particular merit when produced according to the present invention may include archery bows having either a simple, recurve or compound bow configuration, tool handles and leaf springs the latter of which may be substituted for the more conventional metal leaf springs as utilized, for example, in lightweight vehicles such as a camper trailer or other recreational vehicles.

The formation of molded products by the use of impregnated reinforcing strands has often presented considerable difficulties. The placement of individual impregnated strands within a mold cavity obviously would be an extremely time-consumming inefficient procedure. The referenced U.S. Pat. No. 2,980,158 offered an accelerated, more efficient procedure yet still falls far short of providing an automated, high-yield system since much is required in the way of manpower to wind a strand of impregnated fibers about a rack until the desired mass is achieved, following which, the wound frame must be hand positioned within a mold for the final curing step.

By the present invention, an improved method and apparatus is proposed for the formation of a plurality of sequentially molded elongated-shaped members which are produced from an intermittently advanced bundle of endless impregnated parallel fibers. The resultant mold products according to this invention have been found to be greatly improved as to uniformity due to the inclusion of an improved bundle supply station, clamp assemblies and bundle advancing mechanism which operate in a substantially continously moving sequence in critical timed relationship to a reciprocating molding station.

The improved advancing mechanism produces a sequential advancement of an impregnated glass fiber bundle by the simultaneous forward displacement of a closed multi-clamp advancing mechanism together with the rearward displacement of an opened multi-clamp advancing mechanism. From this operation, there is formed a plurality of sequentially molded elongated-shaped cured reinforced plastic members from an intermittently advanced bundle of endless impregnated, longitudinally extending parallel fibers, all in an improved manner not heretofore known.

Additionally, non-contact heating means are proposed for pre-heating the advancing bundle immediately prior to delivery to the molding and curing station of the apparatus. By employing a pre-heating operation, such as by subjecting the moving bundle to a radio frequency (RF) field, the time required to mold and cure each product may be substantially reduced with a significant resultant increase in the output of the apparatus.

Accordingly, one of the objects of the present invention is to provide an improved method for sequentially forming a molded product from a longitudinally extending bundle of impregnated fibers wherein the bundle is advanced to a mold in a step-by-step manner by means of two pairs of alternately advancing and retracting clamp assemblies.

Another object of the present invention is to provide an improved apparatus for sequentially forming a molded product including a bundle supply station from which an impregnated longitudinal bundle is delivered to a pair of reciprocating clamp assemblies which pull a section of the bundle to a mold station while a second set of clamp assemblies are displaced rearwardly to engage the bundle before release of the clamping action of the first pair of clamp assemblies.

A further object of the present invention is to provide an improved apparatus for sequentially forming a molded product including advancing means for a bundle of impregnated strands comprising two pairs of alternately advancing and retracting clamp assemblies with one said pairs adapted to straddle a mold body with means in the mold automatically severing the bundle within the mold station during its closure.

Still another object of the present invention is to provide an improved apparatus for sequentially forming a molded product including a bundle of impregnated fibers sequentially advanced from a supply station to a mold station by means of two pairs of clamp assemblies with each said pair including separable jaws alternately opening to allow passage of the other set of said clamp jaws when said two pairs of assemblies pass one another in opposite directions.

Another object of the present invention is to provide an improved apparatus for sequentially forming a molded product from a bundle of plastic impregnated fibers including two sequentially actuated advancing mechanisms extending from beyond an exit end of a molding station and through to a point beyond an entrance end thereof together with pre-heating means acting upon the bundle adjacent the entrance end of the molding station.

With these and other objects in view which will more readily appear as the nature of the invention is better understood, the invention consists in the novel construction, combination and arrangement of parts hereinafter more fully described, illustrated and claimed.

FIG. 3 is an enlarged side elevation of one of the clamp assemblies;

FIG. 4 is an end elevation, partly in section, taken along the line 4—4 of FIG. 3; and FIG. 5 is an enlarged side elevation, with portions in section, of the rear corner of one mold section of the mold station shown in FIG. 2.

Similar reference characters designate corresponding parts throughout the several views of the drawings.

Figure 1:
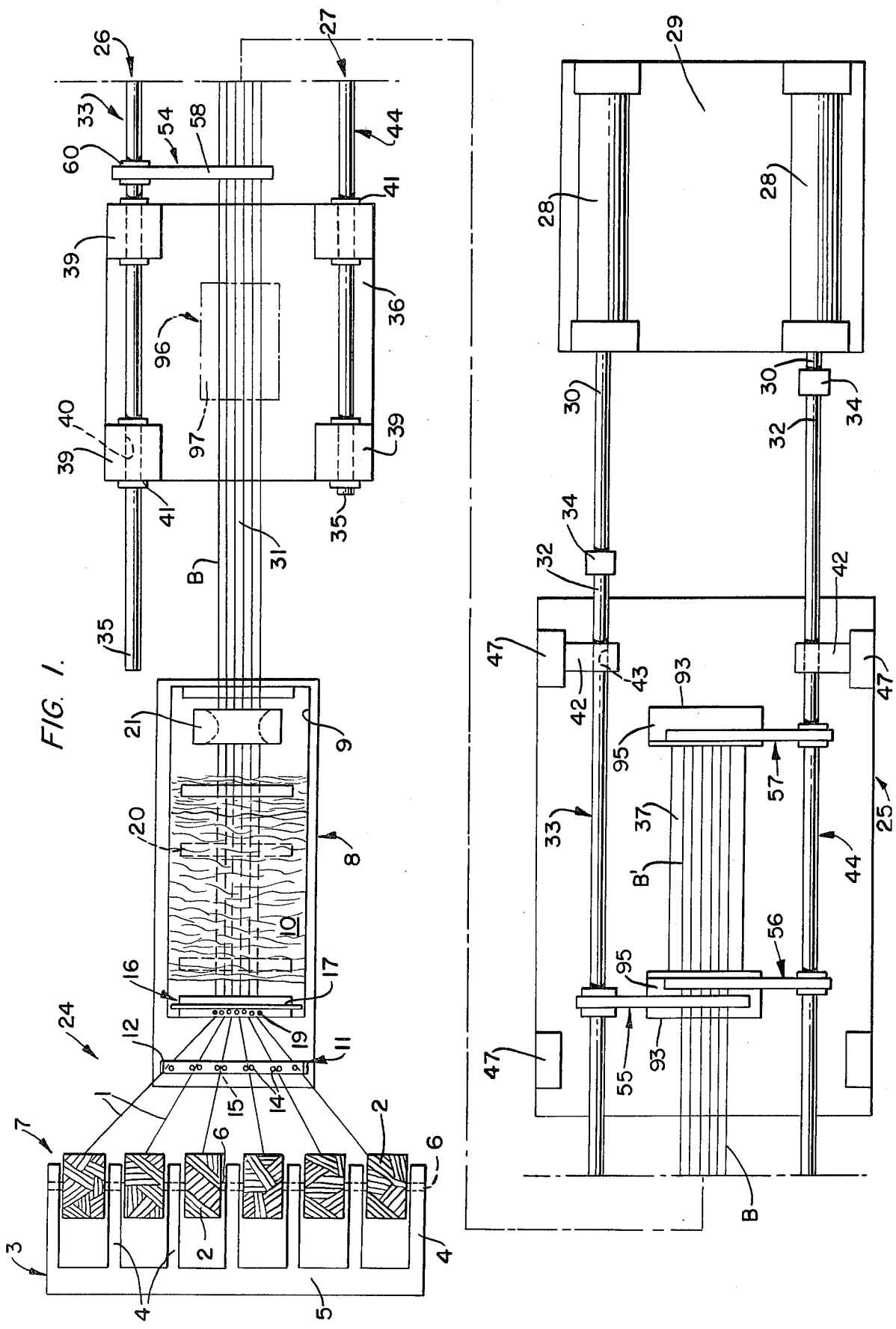
FIG. 1 is a top plan view of a molding apparatus according to the present invention.
Figure 2:
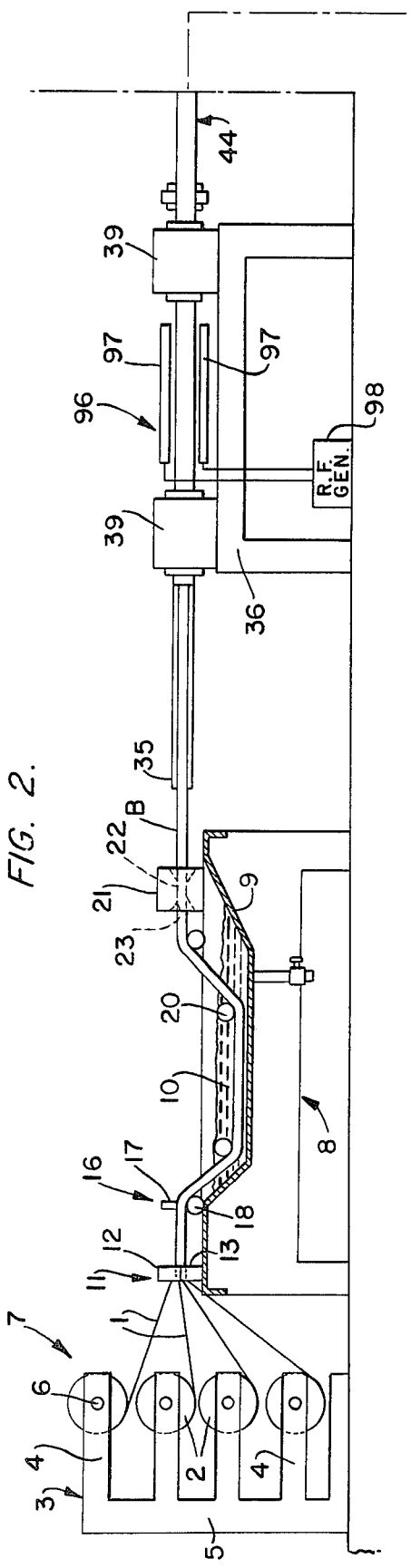
FIG. 2 is a side elevation of the assembly line shown in FIG. 1.
Figure 2:
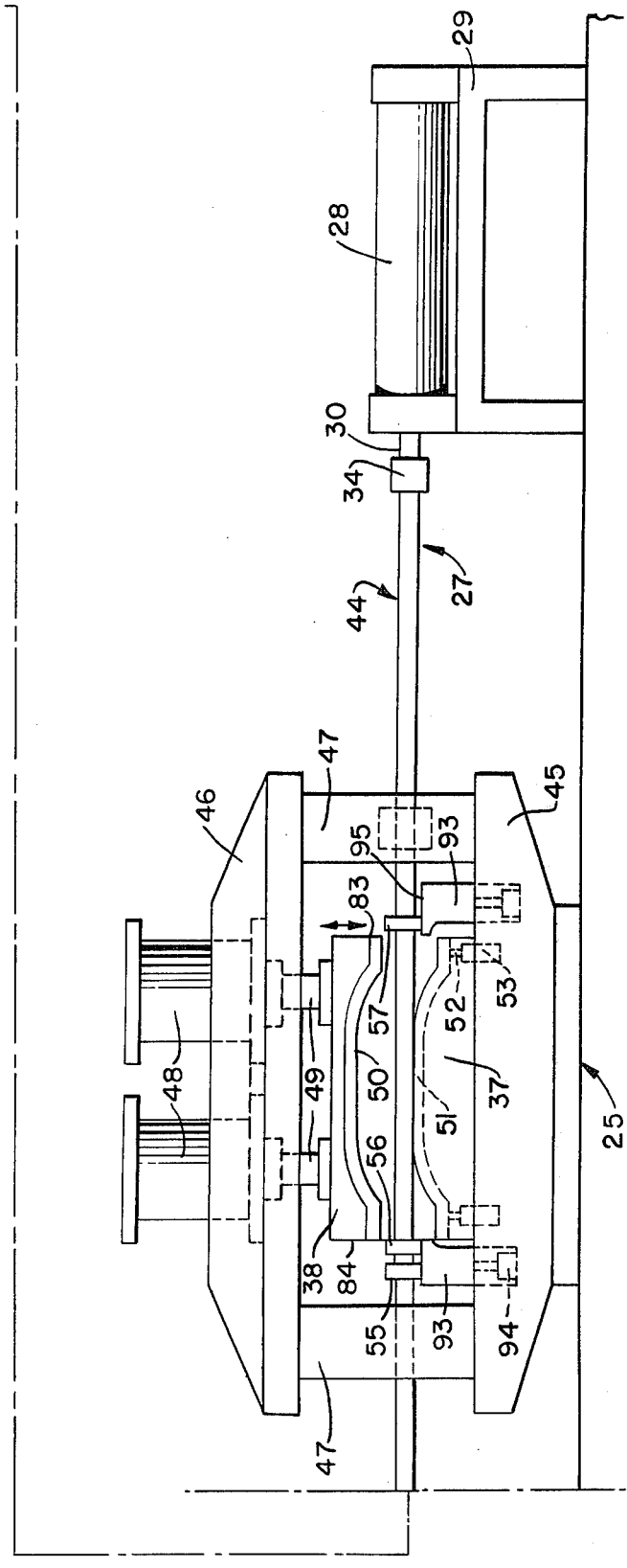

Referring now to the drawings, particularly FIGS. 1 and 2, the present invention will be understood to comprise an assembly line including improved components cooperating in a prescribed relationship to produce an elongated molded product from a plurality of impregnated reinforcing elements. The reinforcing elements preferably comprise individual strands 1 of glass fiber which are stored and supplied from a plurality of rolls 2 mounted upon stationary axes by means of an appropriate stand generally designated 3. Each roll 2 will be understood to comprise a continuous or indefinite length of a glass fiber strand 1 and the strand 3 is constructed to allow mounting of a suitable number of the rolls 2 according to the desired cross-sectional dimensions of the end product. It is important to realize that although the rolls are disclosed as containing strands of reinforcing material which when combined form a bundle B, other forms of the reinforcing material may be provided such as unwoven mats or woven cloth or belts. The selected reinforcing material may comprise a single type of material or a combination of two or more types which may be arranged to provide a bundle having any of various cross-sectional configurations.

To provide the bundle B a plurality of vertically aligned rows of rolls 2 are supported by means of spaced apart arms 4 extending forwardly from the stand frame member 5 with each horizontal row including suitable support rods 6 journaled within the spaced apart arms 4.

The foregoing structure comprises a fiber let-off assembly or creel, generally designated 7, from which a required number of individual strands 1 of glass fiber are fed to an immediately adjacent resin impregnating tank 8 having a bath pan 9 containing a supply of liquid resin 10. The plurality of individual fibers or strands 1 are admitted to the tank 8 through guide means intended to insure maintenance of a parallel relationship between the plurality of strands. This guide means comprises an initial planar guide 11 including spaced apart upper and lower guide elements 12 and 13 respectively, between which all of the incoming strands 1 are disposed. A plurality of vertical pins 14 between these upper and lower guide elements establish individual passageways 15 each intended to receive one or more strands 1 as shown most clearly in FIG. 1 of the drawings.

The resin 10 may comprise any suitable plastic composition, either thermo-plastic or thermo-setting and although a thermo-setting resin 10 is referred to in the initial portion of the following description it will be apparent that the basic inventive concept may be practiced with either type of resin.

With the plurality of strands 1 thus exiting the planar guide 11 as a mass of converging strands confined to a substantially minimal height, they are directed to the subsequent lateral guide 16 containing vertically spaced apart top and bottom members 17 and 18. Appropriate vertical spacers 19 between the members 17 and 18 are arranged to provide an even closer disposition between each adjacent pair of strands 1 whereby the conglomeration of strands exit from the lateral guide 16 substantially as a longitudinally extending mass of parallel fibers juxtaposed one another and forming a bundle B. Appropriate horizontal guides 20 within the tank pan 9 provide means insuring that as the mass of strands are drawn through the pan they will be fully submerged below the level of the resin in the pan. The bundle B of parallel strands exit the bath at a point above the confines of the bath pan 9 and are drawn to a resin meter device 21 provided with a longitudinally extending bore 22 preferably having entrance and exit tapers 23 as shown in FIG. 2.

From the foregoing it will be understood that upon applying a pulling action in a longitudinal direction away from the fiber let-off assembly 7, the bundle B of strands will become immersed within the liquid thermosetting resin bath 10 with the mass of strands becoming impregnated with the resin. As the bundle is directed upwardly from the confines of the bath, it is obvious that a certain amount of excess resin adhering to the mass of fibers will both run back downwardly along the upwardly inclined bundle as well as drip downwardly therefrom back into the bath. Experience has shown that metering means are necessary to remove from the bundle the objectionable amount of excess resin associated with the bundle exiting from the bath 10. Accordingly, the meter device 21 is provided and located above the confines of the tank pan 9 so as to receive the removed excess resin and yield the desired resin-to-fiber ratio to insure a bundle B having optimum physical and chemical properties.

The fiber let-off assembly 7 and resin impregnating tank 8 combined may be referred to as a bundle supply station 24 from which issues the plurality of longitudinally aligned, parallel, resin impregnated fibers forming the bundle B prepared for subsequent treatment in the press or molding and curing station, generally designated 25. Unique means are associated with the molding and curing station to provide sequential advancement of the bundle B from the supply station 24 to the molding and curing station 25. This means comprises a first advancing mechanism 26 operated in coordination with a laterally adjacent, parallel second advancing advancing mechanism 27, both of which extend from a point well ahead of the entrance of the molding and curing station to a point beyond the exit end thereof. Initially, a description of one of the advancing mechanisms 26 will serve to convey the construction of both advancing mechanisms 26 and 27 inasmuch as each of the two mechanisms includes generally similar, oppositely disposed components.

As shown most clearly in FIG. 1 of the drawings, the advancing means for pulling the impregnated glass fiber bundle B from the bundle supply station 24 to the molding and curing station 25 includes a double-acting power cylinder 28 fixedly supported in a horizontal manner upon a motive stand 29 and which contains a piston rod 30 directed rearwardly toward the direction of the press 25 and bundle supply station 24. The longitudinal axis of the power cylinder 28 and its piston rod 30 will be understood to be disposed parallel to the longitudinal axis of the bundle center line 31 and is substantially off-set to one side thereof a distance preferably equal to the off-set of the axis of the piston rod 30 of the second advancing mechanism 27. The leading end 32 of a first reciprocating clamp rod 33 is joined to the piston rod 30 by means of an appropriate coupling or connector 34 and this rod will be seen to extend longitudinally through the molding and curing station 25 with its free trailing end 35 disposed well rearwardly of a stationary clamp rod support stand 36, when the piston rod 30 is in the extended position such as illustrated in the upper portion of FIG. 1 of the drawings.

The referenced support stand 36 is located rearwardly of the press elements or mold sections 37 and 38 in the molding station 25 a distance which is greater than the longitudinal length of these mold sections for reasons which will become obvious hereinafter. The portion of the clamp rod 33 disposed adjacent its free end 35 is quided and retained by means of a pair of rod supports 39 mounted atop the support stand 36 at spaced apart points along one side thereof. Each support 39 includes a bore 40 provided with an appropriate bushing or bearing 41 for the slidable reception of the clamp rod 33. The opposite portion of the first clamp rod 33 is similarly retained adjacent its leading end 32 by means of a fixed support block 42 likewise provided a longitudinal bore 43.

With the foregoing structure in mind, it will be understood that upon actuation of the power cylinder 28, either pneumatically or hydraulically, the first clamp rod 33 will be moved from its rearward-most position such as shown in FIG. 1 to a forward-most position wherein it would appear as does the second reciprocating clamp rod 44 in this same drawing figure. Thus by manipulating controls affecting the two power cylinders 28—28, the respective first and second clamp rods 33,44 are alternately extended and retracted with respect to the clamp rod motive stand 29 between the two extreme positions shown in the drawings and this reciprocating motion occurs in both instances along axes which are parallel to the center line axis 31 of the bundle B but on opposite sides thereof and preferably at equal distances therefrom.

Before proceeding with a further description of the additional structure included in the two advancing mechanisms 26 and 27, the components of the molding and curing station 25 disosed intermediate the clamp rod support stand 36 and motive stand 29 will be described. The molding and curing station 25 includes a base 45 upon which is mounted the lower, fixed mold section 37 shown most clearly in FIG. 2 of the drawings. This mold section cooperates with the upper, displaceable mold section 38 supported by, and mounted for vertical reciprocation with respect to the top housing 46 which is supported in a position well elevated above the base 45 by means of the plurality of spaced apart upright frame elements 47. As shown most clearly in FIG. 1, the two frame elements 47—47 juxtaposed the clamp rod motive stand 29 serve as fixed mounting means to retain the support blocks 42 within which leading ends 32 of the first and second clamp rods 33,34 are guided such that the two clamp rods pass the opposite sides of the two mold sections 38,37 and between the top housing 46 and base 45 of the molding and curing station 25.

The upper mold section 38 is provided with appropriate means to accomplish vertical displacement thereof with respect to the mating lower, fixed mold section 37 such as the mold actuating cylinders 48 shown in FIG. 2 of the drawings. These cylinders are fixedly mounted with respect to the top housing 46 and include vertically disposed cylinder rods 49 having their lower portions affixed with respect to the mold section 38 so that when appropriately actuated the cylinder rods 49 will cause either upward or downward displacement of the mold section 38 from the position shown in FIG. 2. The mold surface 50 of the uppermost section 38 quite obviously will be configured to cooperate with the opposed mold surface 51 of the lower, fixed mold seciton 37 to produce the desired product when the mold section 38 is lowered with a segment of the bundle B therebetween. In the drawings, the upper mold surface 50 is illustrated to represent a downwardly extending male projection while the lowermost section 51 represents a mating cavity.

It will be understood that when the mold sections are closed the resultant cavity therebetween extends longitudinally with its center axis vertically aligned with the bundle center line 31 while the cross-sectional configuration of the cavity is selected to accommodate the corresponding dimensions of the bundle B.

The two distal portions of the cavity 51 are provided with means to facilitate automatic ejection of a part after it has been molded and cured therein. This means comprises an ejector element 52 adapted to be forced upwardly such as by the ejector cylinder 53 into the space of the cavity 51 for the purpose of pushing upwardly a cured, molded product. FIG. 2 also most clearly illustrates the curved configuration of the mating mold surfaces 50,51 as used to form a typical curved product so readily accomplished by the method and apparatus of this invention.

The impregnated bundle B is pulled and advanced between the confines of the spaced apart mold sections 38 and 37 by means of two pairs of clamp assemblies sequentially displaced between alternate forwardmost and rearwardmost positions by means of the aforementioned reciprocating rods 33 and 44. The first advancing mechanism includes a pair of co-acting clamp assemblies 54 and 55 mounted upon and carried by the rod 33 of the first advancing mechanism 26 as shown most clearly in FIG. 1 of the drawings. The second advancing mechanism 27 will be seen to include similarily longitudinally spaced apart co-acting clamp assemblies 56 and 57 mounted upon and carried by the second reciprocating clamp rod 44. The construction of each of the four clamp assemblies is similar and is illustrated most clearly in FIGS. 3 and 4 of the drawings, wherein it will be seen that the clamp assembly 57, for example, includes an upper arm 58 having at one end a support portion 59 journaled by means of a bearing or bushing mount 60 with respect to the second reciprocating clamp rod 44. Movement of the upper arm 58 is restricted by means of a key 44' carried by the rod 44.

A lower arm 61 is substantially a mirror image of the upper arm 58 and includes a support end 62 fixedly mounted with respect to the bearing mount 60 and restricted in movement relative the rod 44 by the same key 44'. The upper arm 58 is provided with a horizontally extending topmost portion 63 terminating in a free end 64 while the lower arm 61 includes the horizontally extending bottommost portion 65 likewise terminating in a free end 66. The lower surface 67 of the upper arm free end 64 is rounded as shown in FIG. 3 and engages a portion of an upper grip jaw 68 which is pivotally attached thereto in its medial area by means of a pivot 69 to insure a parallel relationship between the bundle cavity 70 therebeneath and mating bundle cavity 71 formed in the opposed lower grip jaw 72 which is fixedly attached with respect to the upper surface of the lower arm free end 66. The aforementioned cavities 70-71 of the two grip jaws 68 and 72 are defined by the base elements 74 on one hand and the two end plates 75 on the other hand. In the case of the upper grip jaw 68, these end plates 75—75 each include a medial tongue 77 as shown in FIG. 4, while the end plates 76—76 of the lower grip jaw 72 each include a mating groove 78. The function of this described relationship will be covered hereinbelow.

Means are provided to produce relative displacement between each pair of upper and lower clamp arms 58,61 so as to move the respective grip jaws 69 and 72 to and from one another with the associated clamp rod 44 serving as a pivot for this movement. This displacement means comprises a two-way actuating cylinder 79 fixedly carried by the bottommost horizontal portion 65 of the lower arm 61 and from which extends a piston rod 80 appropriately attached such as by means of a pivot 81 to a pivot rod mount 82 carried by the top-most horizontal portion 63 of the upper arm 58 so that upon extension of the piston rod 80 it will follow that the upper grip jaw 68 will be displaced away from the lower grip jaw 72 and conversely, when the piston rod 80 is retracted, the two jaws will be closed with the individual cavities 70 and 71 forming a single bounded cavity with the two pairs of tongues 77 mating within the grooves 78 of the end plates 75 and 76. Saw teeth 70' and 71' are provided in the opposed faces of the two jaw base elements 74 with the crests and valleys of the teeth extending transversely of the bundle center line 31.

With the aformentioned key 44' defining the limits of angular displacement of the two arms 58 and 61 relative the rod 44, it will follow that suitable means must be provided to allow closing of these arms from the open position of FIG. 3. By forming widened keyways 59' and 62' respectively in the end support portions 59 and 62 of the two arms they will be free to open and close under the action of the cylinder 79. Obviously, appropriate structure (not shown) is included to preclude unwanted rotation of the clamp rods 33 and 44 while allowing axial displacement thereof through the supports 39 and 42, such as cooperating keys and keyways in the two rods and supports 39 and 42.

The above referred to closing action of each clamp assembly provides means whereupon the bundle B may be engaged about its entire periphery with enough gripping action being applied to enable the running length of the bundle to be pulled and advanced from the bundle supply station 24 to a point within the molding and curing station 25 between the two opened mold sections 37 and 38. It is necessary to employ a pair of clamp assemblies with each advancing mechanism 26 and 27 for more than one reason.

First, when the bundle is pulled to a point between the parted molded sections, it is necessary to retain the thus disposed bundle in a longitudinally extended condition as the mold sections are closed and secondly, as the curved portions of the mold sections are being closed, it is necessary to retain the ends of the bundle therebetween during at least the initial closing to preclude an uneven distortion of the impregnated strands as the curved portions of the uppermost surface 50 and lowermost cavity 51 act upon the bundle section B' therebetween. If both ends of the bundle were not retained adjacent the leading outer face 83 and trailing outer face 84 of the upper mold section 38, the parallel relationship of the plurality of strands 1 within the bundle B' segment would become laterally displaced and foreshortened in an irregular manner leading to poor uniformity in the cross-section of the final product. The reason for employing a pair of the advancing mechanisms 26 and 27 is to not only substantially increase the rate of production but even more importantly to serve as means retaining the forward-most end of the bundle B after the bundle section B' located within the molding and curing station 25 has been acted upon and severed from the balance of the bundle.

The first advancing mechanism 26 may be described as including a trailing clamp assembly 54 spaced rearwardly of a leading clamp assembly 55 while the second advancing mechanism 27 includes a similarly disposed trailing clamp assembly 56 and leading clamp assembly 57. FIGS. 1 and 2 of the drawings, illustrate the clamping assemblies of the second advancing mechanism disposed in the forwardmost position wherein these two clamp assemblies 56,57 will be understood to be closed and in gripping relationship with the length of bundle segment B' located therebetween. This is how the apparatus would appear just prior to lowering of the upper, displaceable mold section 38 to commence the molding and curing operation upon the intermediate bundle section B'. As the cylinder rods 49 are extended downwardly the uppermost section 38 proceeds to urge the span of the bundle segment B' into the female surface 51 of the lowermost section 37 as the male projection 50 of the upper mold section 38 is closed therewithin.

During the above closing of the mold a cut-off element 85 is carried by the upper mold section 38 adjacent its trailing outer face 84, severs the bundle segment B' from the balance of the bundle B immediately forward of the second trailing clamp assembly 56. FIG. 5 of the drawings, illustrates most clearly the cut-off element 85 wherein it will be seen that this element comprises a hardened insert having an outer surface 86 flush with the trailing outer face 84 of the mold section 38 and provided with a lowermost shear edge 87.

At his point it would do well to mention that both mold sections 38 and 37 quite obviously are provided with suitable internal temperature regulating means to provide the necessary temperature in order to complete the appropriate setting of the resin impregnated fibers of the entrapped bundle setting B'. In the case of reinforcing fibers impregnated with a thermosetting resin, the temperature regulating means comprises heating elements such as electrical resistance components 88 contained within both mold sections 38-37 to produce a curing of the molded material therebetween. Appropriate alternative means may be employed to accomplish this heating such as steam passages. Additionally, it will be note from FIG. 5 that immediately above the cut-off element 85 there is located a cooled insert 89 having an outer face 90 flush with the mold section trailing outer face 84 and provided with internal cooling means 91 such as water passageways. Without the cooled insert 89, it will be appreciated that following the shearing of the bundle segment B' by the cut-off element 83, the elevated temperature of the entire upper mold section 38 would have a tendency to pre-cure the exposed cut-off portion of the balance of the bundle B still being retained between the grip jaws of the second trailing clamp assembly 56. Suitable insulation 92 may be provided between the cooled insert 89 and surrounding portions of the upper mold section 38 to enhance the effectiveness of the cooled insert.

Suitable rigid anvil means are included to immobilize the clamp assemblies immediately adjacent both outer mold faces 83–84 during the period the bundle segment B' is being captured between the closing mold sections and being severed from the bundle B. This means is best offered by a pair of clamp supports 93—93 mounted for retraction such as by actuating cylinders 94 so that the top surface 95 thereof may be displaced from the clamp supporting position of FIG. 2 to a lower position allowing opening of the arms of the forwardmost clamp assemblies and passage rearwardly to a point behind the previously rearwardmost clamp assemblies.

Following curing of the molded bundle segment B', the cylinders 48 are actuated to elevate the upper mold section 38 away from the stationary lower section 37 and immediately at this time, the trailing and leading clamp assemblies 56 and 57 of the second advancing mechanism 27 are opened by actuation of their cylinders 79 which sequence occurs either concurrently with or following the lowering of the clamp supports 93. With the two arms 58 and 61 of the clamp assemblies 56 and 57 opened and the top surface 95 of the clamp supports 93 lowered the second clamp rod 44 is extended rearwardly by actuation of its power cylinder 28 until its trailing clamp assembly 56 is juxtaposed the clamp rod support stand 36. Simultaneously with this last mentioned displacement of the second advancing mechanism 27, the trailing clamp assembly 54 and leading clamp assembly 55 of the first advancing mechanism 26 is reciprocated in a forward direction from the position shown in FIG. 1. Keeping in mind that the two clamp assemblies 54 and 55 of the first advancing mechanism 26 are closed and thus firmly gripping the bundle B at two points, it will be appreciated that the bundle will be pulled from the supply station 24 and this displacement continues until the leading clamp assembly 55 has passed the leading outer face 83 of the upper mold section 38 at which point the trailing clamp assembly 54 will be disposed immediately behind the trailing outer face 84 of the upper mold section. During the aforementioned reversed, reciprocating displacement of the two advancing mechanisms, the two closed clamp assemblies of the first advancing mechanism 26 pass between the two pairs of opened clamp assemblies 56 and 57 of the second advancing mechanism 27. A point to note is that the leading clamp assembly of the rearward-most advancing mechanism will be positioned immediately to the rear of the trailing clamp assembly of the forward-most mechanism following each reciprocating displacement of the two mechanisms. This insures a positive gripping engagement of the bundle B in the area close to the mold cut-off element 85. Prior to the subsequent molding and curing operation, the clamp supports 93 are displaced into the position shown in FIG. 2 after which the already described molding and curing operation is repeated.

It will be appreciated that due to the very nature of thermosetting resins the time required to accomplish the heat curing of the bundle segment B' within the station 25 will amount to a far greater length of time than the time necessary to carry out the entire remaining portion of the process described herein. To increase the rate of formation of molded products per hour it will be obvious that any means serving to accelerate the curing station will substantially increase the production rate. Accordingly, it is proposed to include means intermediate the supply station 24 and molding and curing station 25 to pre-heat the bundle B. Appropriate non-contact pre-heating means 96 may be positioned as shown in FIGS. 1 and 2 and includes a pair of spaced-apart radiation plates 97—97 between which the bundle B passes. By joining a radio frequency (RF) generator 98 to the plates 97 and supplying a suitable RF field therebetween, such as 100 megahertz, it will be understood that the bundle B will be pre-heated a significant amount such that much less time will be required for the subsequent curing operation in station 25.

The advantage of employing a pre-heating operation will be readily apparent when considering the following comparison. Assuming the bundle B comprises a composite of 70% (by weight) glass fiber and 30% (by weight) of anhydride epoxy resin, system cured in the station 25 at 300° F., the below listed table reflects the significant distinction between the times required for a normal cycle without pre-heating and a cycle involving pre-heating by exposure to RF (100 megahertz):

| NORMAL CYCLE | | R.F. (100 MEGAHERTZ CYCLE) |
|---|---|---|
| | RF Exposure | 0 (during cure) |
| 0.5 min | Load | 0.5 min |
| 0.5 min | Close | 0.5 min |
| 10.0 min | Cure | 3.0 min |
| 0.5 min | Open | 0.5 min |
| 0.5 min | Unload | 0.5 min |
| 1.0 min | Clear | 1.0 min |
| 13.0 min | Total | 6.0 min |

From the above it will be seen that with the pre-heating operation, the curing time is reduced more than one-third while the time for a complete cycle of the molding and curing station 25 is reduced to less than one-half that required when the bundle is not preheated.

As previously indicated, it would be possible to utilize a thermo-plastic resin in place of thermo-setting resin for impregnating the reinforcing fibers or strands. In such an instance, a suitable high viscosity polymeric composition may be liquified, as by heating wih RF energy, following which the impregnated bundle is molded and frozen. Thus, the mold sections 37–38 would chill the bundle segment B' therebetween and accordingly, instead of heating elements 88, appropriate cooling or refrigeration means would be used.

One additional point to note relates to the operation of the clamp assemblies located at the station 25 during the molding sequence. As noted in FIG. 2 of the drawings, a typical curved product will be formed as a result of the substantial vertical curvature of the mold surfaces 50 and 51. It will thus follow that during closing of the mold sections 37–38, pressure will be applied upon the bundle segment B' and unless corrective action is applied, the clamped and as yet unsevered bundle segment B' would be stretched. Accordingly, it will be understood that the keyways 59' and 62' of at least the two leading clamp assemblies 55 and 57 may be longer than the contained key 44' such that upon closing of the mold sections 37–38 at least one clamp assembly located at the molding station 25 will be free to be axially displaced along its rod 33 or 44.

I claim:

1. The method of sequentially forming molded products comprising the steps of: feeding from a supply station a bundle including a running length of resin impregnated reinforcement, delivering said bundle from said supply station to a molding station by means of a pair of alternately reciprocating advancing mechanisms, each said advancing mechanism including a pair of spaced apart clamp assemblies each having two vertically aligned grip jaws operable to engage and release the full transverse extent of said bundle, reciprocating one said pair of clamp assemblies with said grip jaws closed to advance said bundle to said molding station from an area intermediate said supply station and molding station with said one pair of clamp assemblies straddling said mold station to position a segment of said bundle therewithin, concurrently reciprocating the other of said pair of clamp assemblies in an opposite direction with its respective said grip jaws opened and fully by-passing the closed grip jaws of said one pair of clamp assemblies, closing said grip jaws of said other pair of clamp assemblies upon said bundle in an area intermediate said supply and molding stations, operating said molding station to sever a segment from the remainder of said bundle and to form a molded product therein and ejecting the molded product from said molding station.

2. A method of according to claim 1 wherein, said bundle includes glass fiber reinforcement impregnated with a thermoplastic resin and including the step of cooling said mold station to freeze said bundle segment as it is molded therein.

3. A method according to claim 1 wherein, said bundle includes glass fiber reinforcement impregnated with a thermosetting resin and including the step of heating said mold station to cure said bundle segment as it is molded therein.

4. A method according to claim 3 including, preheating said bundle intermediate said supply and molding stations.

5. An apparatus for sequentially forming molded products from a continuous length of reinforced resinous bundle including, a supply station adapted to deliver a reinforced resinous bundle, a molding station for receiving the bundle and forming a product therefrom, first and second advancing mechanisms for engaging and pulling said bundle from said supply station to said molding station, said molding station having a pair of mating mold sections, means displacing said mold sections relative one another to open same for the admittance of a segment of said bundle prior to the closing of said mold sections to form a molded product from the admitted bundle segment, each said advancing mechanism including a rod extending from a point beyond one leading end of said mold station to a point beyond the opposite trailing end of said mold station, means mounting each said rod for longitudinal movement substantially parallel to the center axis of said bundle, a pair of laterally spaced apart clamp assemblies mounted upon each said rod, motive means for reciprocating each said rod to alternately displace said pair of clamp assemblies of one said advancing mechanism fully past said pair of clamp assemblies of the other of said advancing mechanisms, each said clamp assembly provided with a pair of opposed releasable grip means selectively operable simultaneously with said grip means of the other said clamp assembly of the same said advancing mechanism both to open and to close said grip means relative said bundle, all said grip means extending transversely no less than the full width of said bundle, said pair of clamp assemblies mounted on each said rod spaced from one another a distance sufficient to straddle said mold sections whereby, said motive means alternately reciprocates said two rods as said two pairs of clamp assembly grip means alternately engage said bundle intermediate said supply station and molding station, advance said bundle to a position between said opened mold sections, release said bundle and following molding of the bundle, by-pass the grip means of the other of said clamp assemblies to again engage said bundle intermediate said supply station and molding station.

6. A molding apparatus according to claim 1 wherein, said motive means includes a double-acting power cylinder.

7. A molding apparatus according to claim 1 wherein, said two advancing mechanism rods are mounted on opposite sides of said bundle and mold sections a substantially equal distance from said bundle center axis.

8. A molding apparatus according to claim 1 including, reciprocating ejector means within one said mold section operable to eject a molded product therefrom.

9. A molding apparatus according to claim 1 including, cut-off means carried by said trailing end of one said mold section to sever a segment from the remainder of said bundle.

10. A molding apparatus according to claim 9 wherein, said bundle comprises thermosetting resin impregnated glass fibers, heating means in said mold sections and a cooled insert on one said mold section adjacent said cut-off means.

11. A molding apparatus according to claim 1 wherein, each said clamp assembly includes a pair of substantially horizontally disposed arms each having one support end carried by one of said rods and said grip means includes a jaw at an opposite free end of each said arm.

12. A molding apparatus according to claim 3 including, two-way actuating means mounted between each pair of said cooperating arms to alternately open said two pairs of jaws of one said advancing mechanism when bypassing said jaws of the other said advancing mechanism and to close said jaws when engaging said bundle to advance the bundle to said molding station.

13. A molding apparatus according to claim 11 wherein, each said rod and at least one said clamp assembly arm support end includes a cooperating key and keyway whereby the degree of relative movement between each said pair of arms is restricted.

14. A molding apparatus according to claim 11 wherein, each said grip jaw includes a base element having an irregular surface extending transversely of said bundle center axis and mating end plates at both ends of opposed pairs of said grip jaws adapted to confine the lateral extent of said bundle therebetween.

15. A molding apparatus according to claim 11 including, pivot means mounting one said jaw relative its respective said free end.

16. A molding apparatus according to claim 1 wherein, said supply station includes a creel for delivering a continuous length of reinforcement, and a resin tank intermediate said creel and molding station for impregnating said reinforcement.

17. A molding apparatus according to claim 15 wherein, said resin tank contains a thermoplastic resin and said molding station sections include chilling means to freeze said bundle therebetween.

18. A molding apparatus according to claim 15 wherein, said resin tank contains a thermosetting resin and said molding station sections include heating means to cure said bundle therebetween.

19. A molding apparatus according to claim 18 including, non-contact heating means acting upon said bundle prior to advancement to said molding station to pre-heat said bundle.

20. A molding apparatus according to claim 19 wherein, said non-contact heating means includes means generating a radio frequency field.

* * * * *